United States Patent [19]

von Meister et al.

[11] 4,139,739

[45] Feb. 13, 1979

[54] TELECOMMUNICATIONS CALL BACK SYSTEM

[75] Inventors: William von Meister, McLean, Va.; Alan Peyser, Silver Spring, Md.

[73] Assignee: TDX Systems, Inc., Vienna, Va.

[21] Appl. No.: 812,891

[22] Filed: Jul. 5, 1977

[51] Int. Cl.² .............................................. H04M 3/42
[52] U.S. Cl. ................................................. 179/18 B
[58] Field of Search ......................... 179/18 BG, 18 B

[56] References Cited

U.S. PATENT DOCUMENTS

| 3,931,476 | 1/1976 | Matthews ...................... 179/18 B X |
| 3,934,095 | 1/1976 | Matthews et al. ............. 179/18 B X |

*Primary Examiner*—William C. Cooper
*Attorney, Agent, or Firm*—Cushman, Darby & Cushman

[57] ABSTRACT

A centrally located processing unit controls the use of long-distance communication circuits and records the use of the circuits. The centrally located processing unit selects the least expensive telephone line available and instructs the remote satellite to thereby insure the optimum use of bulk rate communications lines. Where no desired bulk rate communication facility is available, a user enters a call-back number into the processing unit and is called back at that number when the facility becomes available.

14 Claims, 11 Drawing Figures

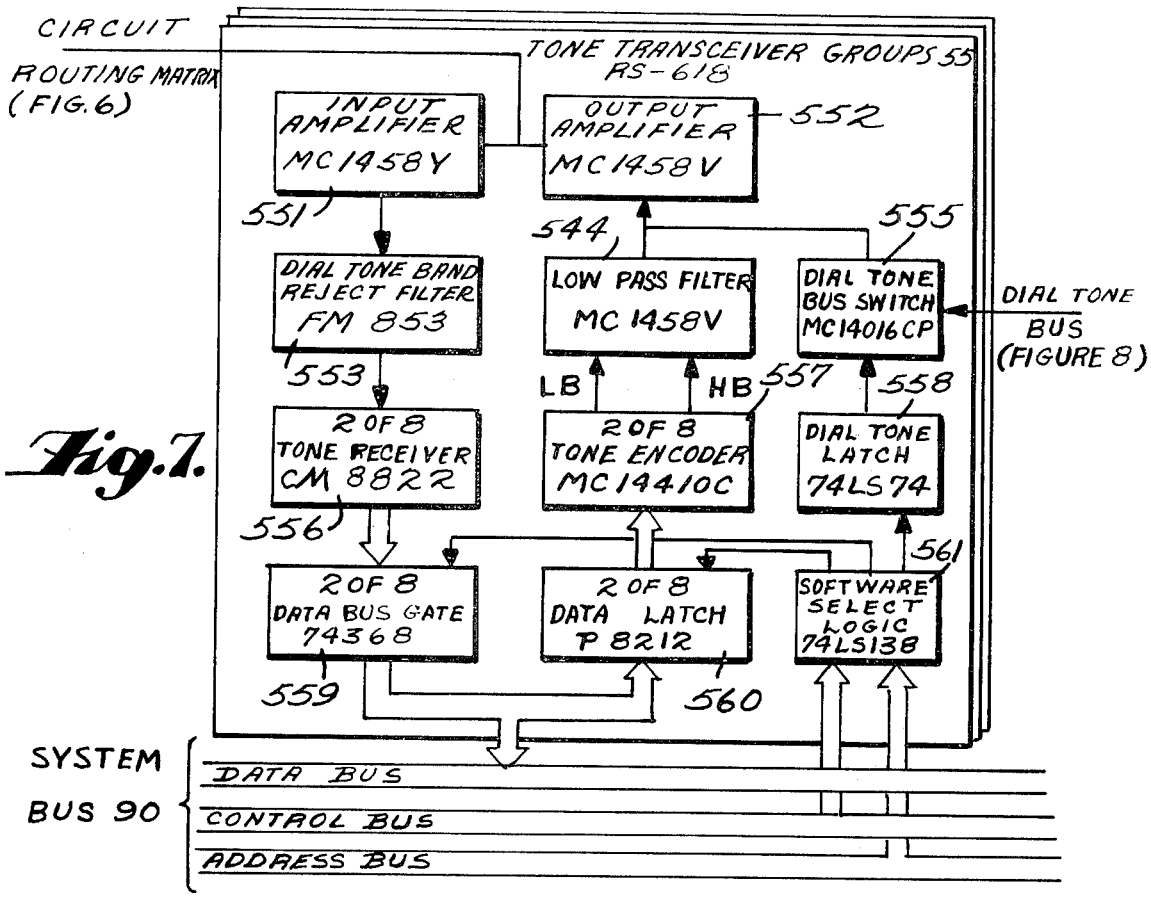
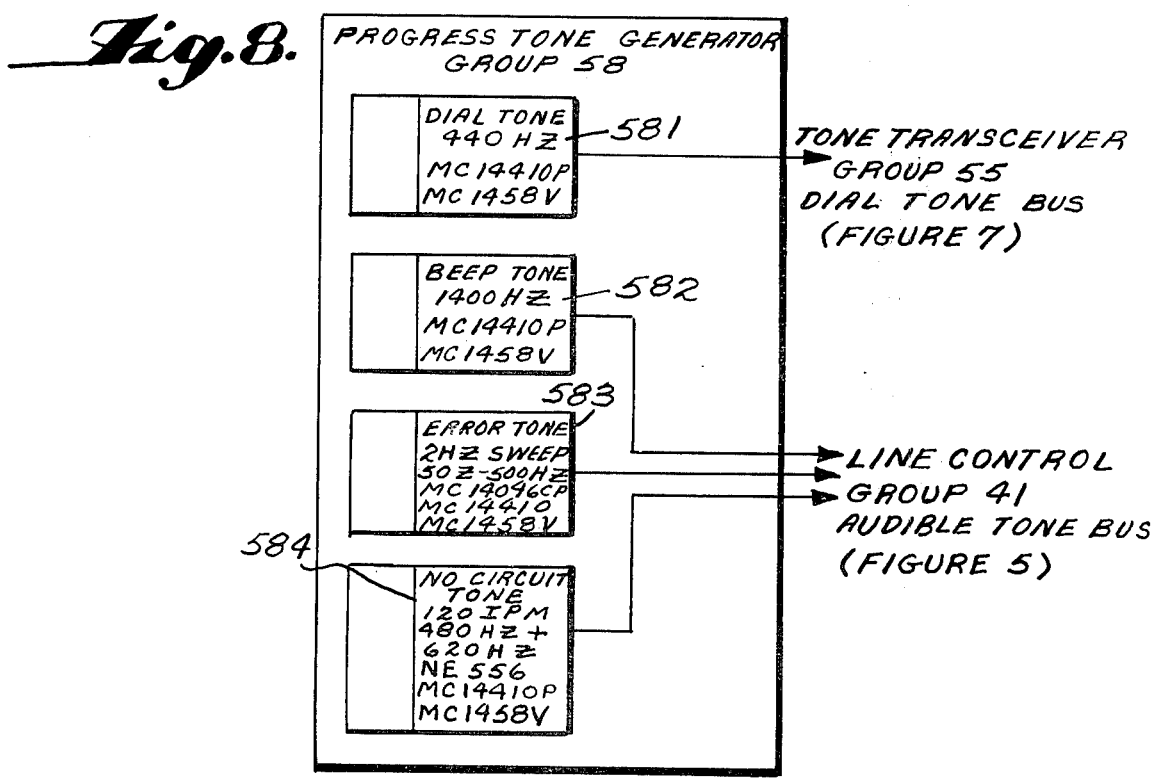

TELECOMMUNICATIONS CALL BACK SYSTEM

CROSS REFERENCE TO RELATED APPLICATION

Of interest is U.S. application Ser. No. 793,428, "Telecommunication Management and Control System", filed by the present inventors on May 3, 1977.

BACKGROUND OF THE INVENTION

The invention relates to a communications line control system and more specifically relates to a control system for controlling and recording the use of long-distance communication circuits.

Until recently, PBX or CENTREX users were limited to dial access and manual access through an operator to long-distance or bulk facilities. In a dial access system, the users completed the call or, if all of the bulk facilities were busy, obtained blocking, i.e., trunk busy signals. In a manual system, an operator placed the call, generally after toll ticketing it manually, over bulk facilities or long distance and, if requested, manually queued the call by calling back the user when the appropriate bulk facility was available. More recently, the telephone company has introduced various modes of flexible route selection systems (FRS) whereby a user's call may be automatically processed on a number of different types of bulk facilities, depending on the route selected by the user. In order to enhance the use of the bulk facilities, the concept of automatic queueing of calls by holding onto their line for a specific time, generally 30 to 60 seconds, was implemented. Such automatic queueing allowed more efficient use of the bulk facilities and thereby lowered the cost per minute to the user. However, in each of these cases, cost is generally traded off with service, as will be explained.

A manual system is inefficient with respect to obtaining access for a user to a particular desired bulk facility because the operator controls the call and it is somewhat inefficient with respect to utilization of the bulk facility per se. In a manual system, the operator must note that the desired facility has become available, generally by observing a light, and then call back the user before placing or dialing the call on the bulk facility. During this interim period, the facility is not used, thus rendering the system inefficient.

Dial access systems, wherein the user dials the facility directly on a hit-or-miss basis, are inefficient. The user often obtains a busy signal and, since no indication is provided as to when the facility will become available, the line often sits idle while the user waits.

Dial access systems can be provided with an alternative method of accessing bulk facilities, commonly termed "hold-on" queueing, whereby the user waits for a bulk facility to become available with his telephone off-hook. In such systems, the user is either passed immediately onto a line or waits, generally for up to 60 seconds, for a line to become available. If no line in the desired bulk facility becomes available during that period, the call is overflowed to other more costly facilities or direct distance dial trunks (DDD). While hold-on queueing increases the likelihood of the user gaining access to the bulk facility, as compared to dial access systems without hold-on queueing, the user is often overflowed before a bulk facility is accessed. The average duration of a business telephone call is on the order of five (5) minutes. Accordingly, the likelihood of a bulk facility becoming available during the 60 second hold-on period is relatively small. Larger hold-on periods are impractical in that the user's line is tied up during the hold-on period.

The longer the user is willing to wait, the greater the likelihood that a particular bulk facility, line or group of lines will be available for placing the call. Thus, it is desirable to provide a call-back system wherein the user can wait for a relatively long period of time for a facility to become available, without tying up his line for that period or requiring that the facility stand idle while the user or operator redials the called number.

A call-back system in accordance with the present invention provides the automatic calling back and placing of calls through electronic means and is able to store the called number so that neither the user nor operator has to redial the called number when the bulk facility becomes available and, further, wherein the user's line is not tied up during the waiting period. The caller enters the least-cost routing system by dialing an access code through his PBX or CENTREX. After obtaining a system dial tone, entering an account number (if required), the long distance number (10 digits, speed or tie line) is dialed. The computer checks the least-cost routing table to see if an appropriate line is available. If a line is available, the call is automatically outdialed, but if one is not available, the caller is given an All Trunks Busy signal and then return of the system dial tone. The caller then enters the extension of the PBX or CENTREX to be called back. The computer processor stores the call-back number and the long-distance number and places the call in an appropriate queue, in accordance with a predetermined priority classification of the user or call.

The call continues to move up in the queue and when the appropriate line becomes available, the computer controls the system to dial out the extension of the caller through the PBX or CENTREX. When the caller goes off-hook, the system then grabs the available line (which has been saved during the call-back period) and automatically places the call on the bulk facility for the caller.

If the caller is using his telephone at the time of call-back, the system detects the busy indication and places the call-back in queue and will continue to try until the call-back can be placed.

Obviously, during the waiting period, the caller can accomplish other work and the system operates in the most efficient and economical manner by "holding" the calls until the correct line is available.

It is most important to recognize that the smaller the group of bulk facilities, the more important it is to have a long waiting time in order to maximize access by a particular user to the bulk facility. As an example, if there is a single line group (like an intrastate line or an FX line) and the users of the calling company average 5 minutes per telephone call, it becomes apparent that the likelihood of obtaining the single line becomes greater, if it is in use, the longer the caller waits. If the waiting period is 30 or 60 seconds for the 5 minute call, the chances of getting the line are small, about 60/300 seconds or 20%, depending on when the caller enters the system. If the caller has automatic call-back capabiility, as in a system in accordance with the present invention, he may wait up to the predesignated time, usually 10 minutes and the likelihood of having the call placed on the bulk facility is excellent. This system is, in fact, about 20% more efficient than an automatic queueing system using hold-on and, because of the automation of placing the calls and knowing when the line is available, about 12% more efficient than operator queueing.

Copending application Ser. No. 793,428, "Telecommunications Management and Control System", filed on May 3, 1977 by the present inventors, relates to a method and apparatus, hereinafter referred to as the "least cost routing system", for switching long-distance telecommunications circuits wherein a central processing system is coupled to each of a plurality of remote satellite switching units. Each remote satellite switching unit includes a circuit routing matrix for connecting a local station to a selected long-distance line which may, for example, be a local trunk line, bulk rate lines such as WATS, foreign exchange or tie lines or lines between remote units. The remote satellite switching unit also includes a microcomputer system for detecting the status of outgoing lines from a PBX or CENTREX and the destination of a requested call. This information is transmitted to the central processing system which, in turn, selects the least expensive line at any given time for transmitting the long-distance call. The least expensive available line information is transmitted back to the microcomputer system which provides command signals to the circuit routing matrix to connect the requested call to the selected outgoing long-distance line. The central processing system compiles a record of the party placing the call, the long-distance line used, the time duration of the call and line utilization of the system, and further observes the status of the remote unit, etc. to compute a periodic account statement for the subscriber.

The present invention is embodied in a similar system. It should be appreciated, however, that, in the present invention, the circuit routing matrix and outgoing line status detection may be incorporated into the central processor (computer) rather than residing in remote satellite switching units. The disclosure of such aforementioned copending application Ser. No. 793,428 by the present inventors is herein incorporated by reference.

A detailed description of a preferred embodiment of the present invention is hereinafter given, with reference to the following drawings wherein:

FIGS. 4 through 10 are more detailed schematic illustrations of the components employed in a switching unit.

DETAILED DESCRIPTION OF THE PREFERRED EMBODIMENT

Figure 1:
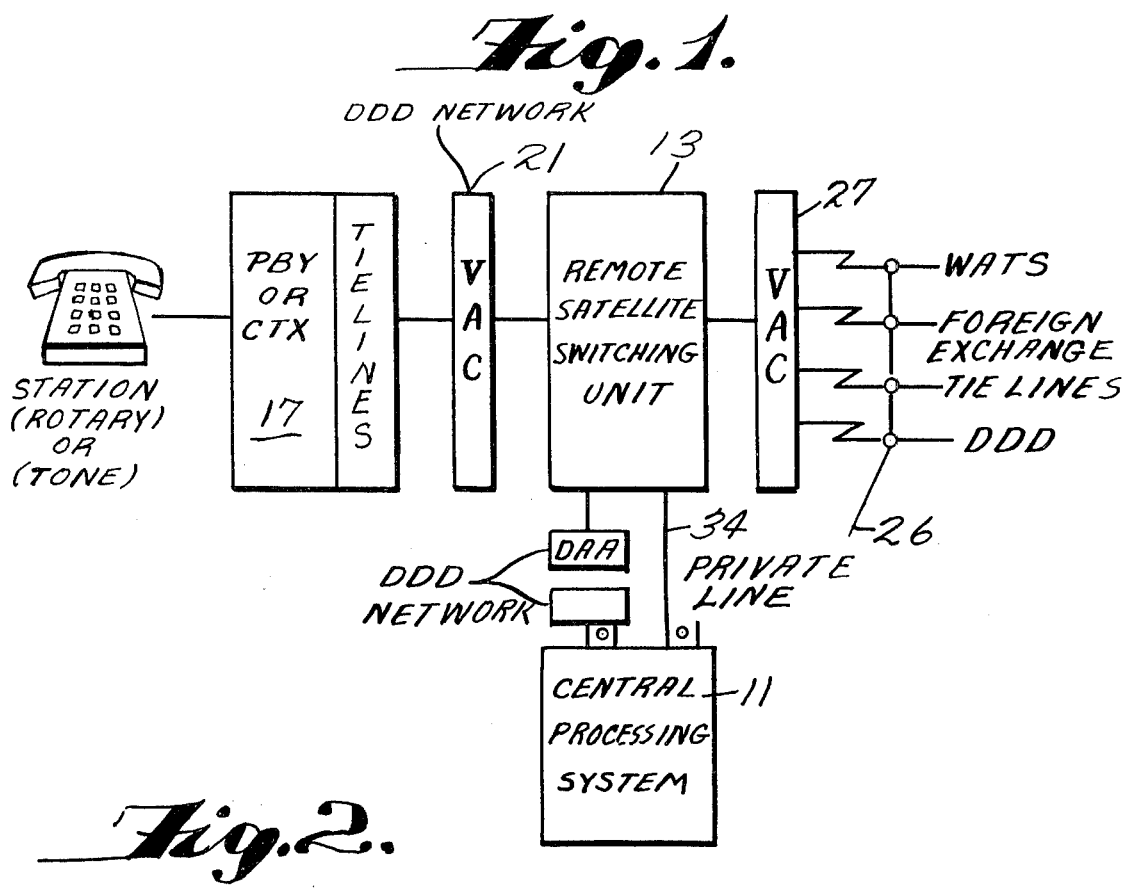
FIG. 1 is a simplified diagram of the system configuration of the present invention.

At the outset, a general overview of the operation and advantages of the system of the present invention will be presented, followed by a detailed description of the preferred embodiment thereof.

The present invention achieves cost reduction in long-distance telecommunications calls through the highly efficient use of bulk-rate communications facilities including WATS, foreign exchange (FX) and tie lines. Because a business organization pays a fixed monthly amount for each such facility, the higher the traffic load or usage per facility, the lower the cost of long-distance on a per minute basis. Thus, in operation, the present system determines from the area code of the number being called whether the subscriber or calling party has an FX or tie line terminated in that area. If not, or if these lines are presently in use, a determination is made as to the lowest cost WATS line available. If the appropriate bulk facility is not available, the user is given an indication of this and enters his extension into the system in order to be called back. The user is placed in the appropriate queue for the particular bulk facility and the system continues to process calls, keeping the user in the queue for a preselected interval, e.g. ten minutes if necessary, and calls back the user when the line becomes available. Thus, the present invention achieves effective utilization of bulk communications lines which may approach a 95% time utilization during peak hours. The availability of local lines insures that no call will wait longer than the predetermined selected interval.

To achieve this, a central processing system preferably communicates with a substantial plurality of remote satellite switching units via leased telephone lines or other commmunications links such as, for example, satellite communications links. In the preferred embodiment, data is transferred between the central processing system and the satellite switching units in block mode using a suitable variable length message format such as ASCII. The central processing unit controls all switching functions and records the necessary data required for billing, generating traffic statistics, etc. from the remote satellite switching unit. It should be appreciated, however, that a call-back system in accordance with the present invention can utilize a single central processor, incorporating the functions of the remote satellite switching units. The central processor and switching units can thus be an integral structure if desired.

Three classes of trunk lines serve as an input to the switching units, namely, rotary dial or tone dial branch trunks which pass from a subscriber's CENTREX or PBX system, standard local lines and incoming WATS service lines. The output trunks from the switching units also fall into three classes, that is, bulk rate lines including outgoing WATS lines, tie lines and/or foreign exchange (FX) lines, local trunk lines and lines to recording devices. The present invention is capable of detecting either tone or rotary dial from the input telephone circuits thereto and addresses the output telecommunication circuit, by means of tone or rotary dial signalling.

To place a long-distance call, a subscriber dials a special access number via the PABX or CENTREX unit. The switching unit responds with a first dial tone. The subscriber then enters a one-to-seven digit account number. The switching unit acknowledges the number with a second dial tone if the account number is valid or with an error signal if the number is invalid. In the case of an invalid number, the first dial tone is reconnected after providing an error tone, thus permitting a second try. After a second invalid attempt, the subscriber is disconnected and the central processing system flags that attempt. If valid, a second dial tone is heard by the subscriber who then dials the desired long-distance number. In response thereto, if no usable trunks are available, the system returns a busy signal, e.g., three tone bursts and then returns a dial tone to the subscriber. The subscriber may then hang up or may enter his call-back number which is up to seven digits. This call-back number is generally the telephone extension of the subscriber but may be an access code plus the extension of the subscriber. Assuming that a number of subscribers have encountered busy bulk rate lines and have requested the system to call them back when a line becomes available, the system preferably has three queues. Subscribers are called back in the descending order of queues depending upon their respective positions within the queues. The number of subscribers that can use the first or second queues is limited so that those in the highest priority queues can have their calls connected to long distance lines first. A user or call priority system can be established by entering the call-back number into one of the respective queues in accordance with predetermined account numbers or priority codes. When an appropriate trunk is available for the subscriber who is waiting for a call-back, the subscriber is called back. When the subscriber goes off-hook, the tone signalling is transmitted into the network and at the same time is fed back to the subscriber's telephone unit so that the subscriber knows the call has been placed.

When the subscriber is called back, the unit will allow three rings to occur before aborting the call-back. If the subscriber's extension is busy, the system will recognize this and place the call-back in the appropriate queue. If the subscriber desires to cancel the call, he may go back on-hook at any time after hearing the transmission of the tone signalling.

If desired, a special account number can be utilized on long-distance calls in order that a particular account can be billed for the call. Thus, the subscriber enters his subaccount number and upon receipt of the second dial tone, the # key on the telephone tone keyboard and any number up to ten digits followed by a second # key is keyed into the system. The system records the number and returns the dial tone after which the subscriber then dials the desired long-distance telephone number. An abbreviated dial number can be keyed into the system in order to simplify the calling procedure on the part of a subscriber. Thus, for example, if there is a group of numbers which are used most frequently, these numbers can be coded into a two-digit number and utilized in lieu of dialing or keying an entire number. To use an abbreviated dial number, upon receipt of the second dial tone, the subscriber enters an *, a two-digit number corresponding to the number desired to be dialed followed by the entry of a #. From rotary phones, two digits are entered, but the second digit cannot be zero or one. The system then automatically retrieves the full number from storage and places the call to the desired party. To enter an abbreviated dial number into the system, the subscriber first enters his account number. Upon hearing the second dial tone, he enters an *, any two digits followed by an * and then a ten-digit telephone number. The system signals its acceptance of the telephone number with a single tone burst or signals its rejection with a two-tone burst. In connection with the aforementioned, it should be understood that the specific format for placing an abbreviated dial number call, etc., can be varied in keeping with the invention by simply changing the logic, i.e., the algorithm, in the central processing system and in the switching unit.

SYSTEM CONFIGURATION

Refer now to FIG. 1, where there is disclosed, in simplified block diagram form, the preferred embodiment of the communications switching system of the present invention. The switching system of the present invention includes central processing system 11 of conventional design known in the art and a plurality of remote satellite switching units 13. Again, an integral central processor-switching unit can be utilized, if desired. As contemplated, in the preferred embodiment, the central processing system 11 can provide control signals for controlling multiple satellite switching units separately and in tandem. Each satellite switching unit 13 has a plurality of input lines connected thereto from voice connecting arrangements 15. The voice connecting arrangement 15 provides isolation between the output lines of a PABX or CENTREX unit 17 and the satellite switching unit 13. Also connected to the input of the satellite switch 13 are local telephone lines 21 which are connected to the switch 13 via a voice connecting arrangement 15. If desired, an INWATTS line can be connected to the satellite switching unit 13.

At the output of the switching unit, a plurality of bulk rate and DDD telephone circuits 26 are coupled to an output voice connecting arrangement 27. As illustrated, the bulk rate lines typically include OUTWATS lines, foreign exchange lines and tie lines. In order to assure the availability of long-distance lines, the output of the switch 13 is also connected to conventional business DDD lines which can be utilized to convey long-distance communications, as desired.

The satellite switch 13 is operated in accordance with command signals from the central processing unit 11. These signals are coupled to the satellite switching 13 via a private data line 34 of conventional arrangement known in the art. Should for any reason the private data line become unusable, an alternative data line interconnect is obtained by automatic dial-up via the DDD network in a conventional manner known in the art.

It should be understood that information signals containing, in coded form, information with respect to the party called, the calling party, the status of lines, etc., are conveyed via the data line switch 34 to the Central Processing System 11 to provide the Central Processing System with information by which a decision can be made as to which output lines should be connected, disconnected, etc. It should also be understood that while a private data line is used in the preferred embodiment of the present invention, other data circuit methods for transmitting command signals to the satellite switches and information from the switches to the Central Processing System 11 can be utilized.

CENTRAL PROCESSING SYSTEM

Figure 2:
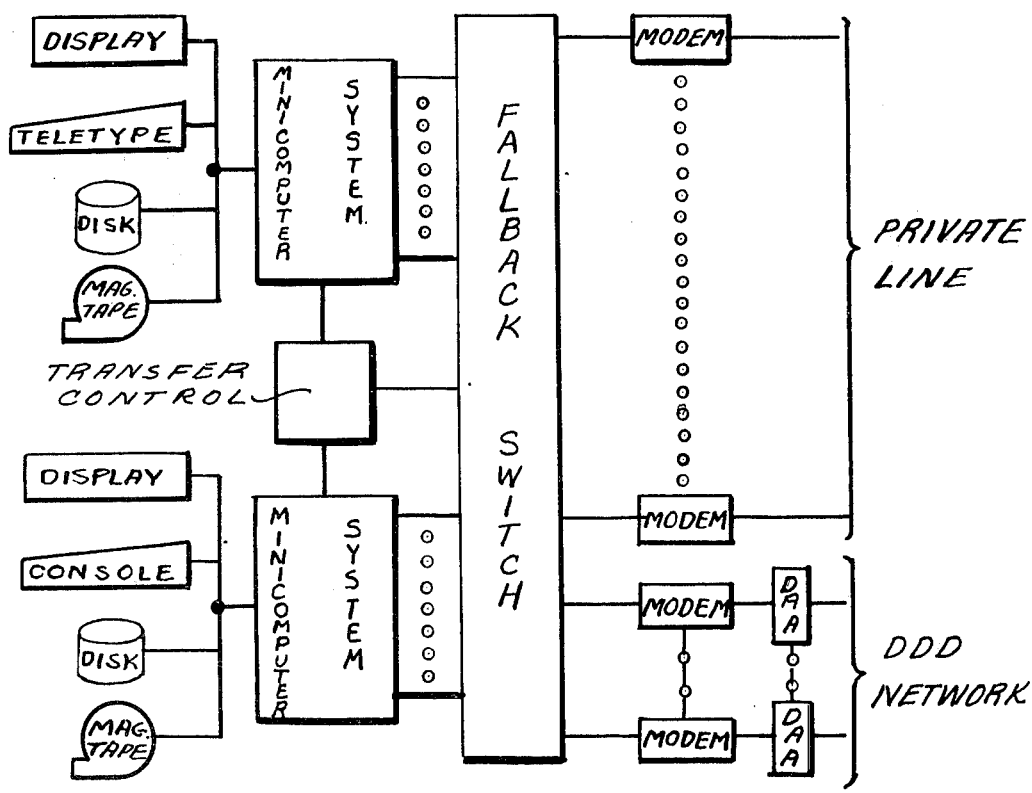
FIG. 2 is a schematic block diagram of the central processing system of the present invention.

Refer now to FIG. 2, where there is disclosed a more detailed schematic block diagram of the Central Processing System 11. The Central Processing System employs a minicomputer system which includes a digital computer for performing the processing of the data from the remote satellite units. In the preferred embodiment, the minicomputer system is an assembly of standard components from Interdata, Inc., Model 7/32 Computer System; however, it should be understood that a number of other systems in the industry meet the application requirements of the invention. Interdata standard components are used in the operation of the Central Processing. The specific hardware and software thereof and, further, the application program package used in the interoperation of the remote satellite unit are identified in the appendix to the aforementioned application Ser. No. 793,428, by the present inventors.

The interoperation with the remote satellite unit is via data communication circuits as aforementioned. The data communication circuits include private line facilities and alternately can employ the switched network on a dial-up basis. The interface with these facilities are commercially available and, for example, are provided by the Bell Telephone System and other independent companies. By convention, the interface between the Minicomputer System and the telephone circuit includes data modem which, in the preferred embodiment, employs a Bell 103 type unit or equivalent. Further, the interface with the DDD network employ data access arrangements (DAA) which, in the preferred embodiment, are commercially available CBS data couplers.

Finally, as illustrated in FIG. 2, the central processing unit is redundant with 100% duplication of the minicomputer system and related peripheral components for the purpose of reliability. Interconnection between either system and the data channels modem hardware is via the Fall Back Switch arrangement, which in the preferred embodiment, employs a commercially available Spectron Corporation Model FBS 1224.

REMOTE SATELLITE UNIT

Figure 3:
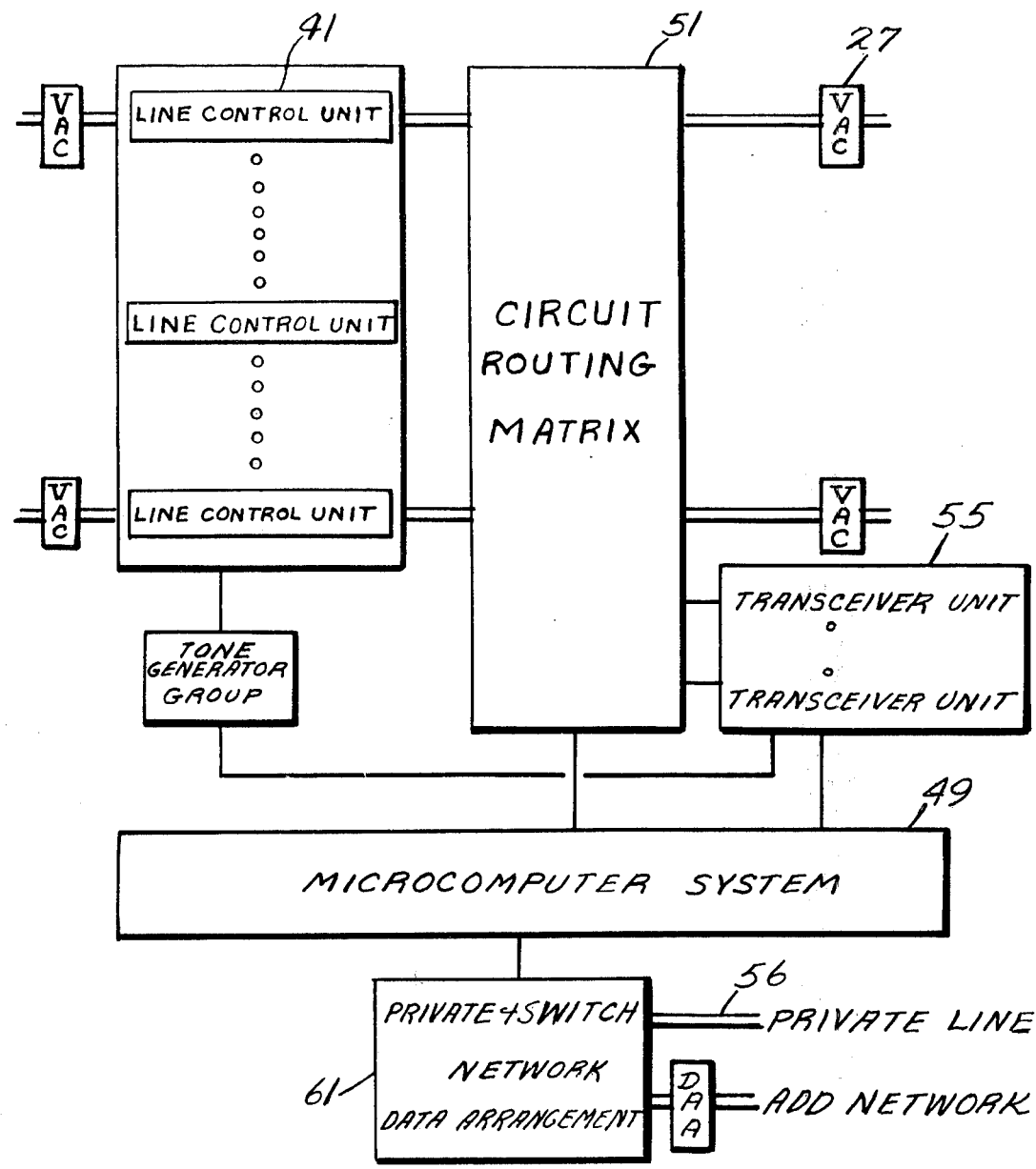
FIG. 3 is a block diagram of a switching unit of the present invention.

Refer now to FIG. 3 where there is disclosed a more detailed schematic block diagram of the remote satellite switching unit 13. Trunk lines from one or more inlet exchanges are connected to a line control unit 41 of the switching satellite unit 13 via the voice connecting arrangements 15. Trunk lines to the outlet exchanges are connected from the circuit routing matrix 51 via voice connecting arrangements 27.

The line control units 41 have the function of providing detection and control of analog and DC signals on the trunk lines by means of a stored program in the microcomputer system 49. The line control units 41 interconnect directly with the inlet voice connecting arrangements 15 and with outlet voice connecting arrangements 27 via the circuit routing matrix 51. The voice connecting arrangements typically employed for interposition with Bell facilities are Bell VCA - CDQ2W for tie trunks interconnect and CDH for any of the other aforementioned interconnects.

Each inlet voice connecting arrangement 15 is assigned to a line control unit 41 and the associated inlet port on the circuit routing matrix 51. Each outlet voice connecting arrangement 27 is assigned to an outlet port on the circuit routing matrix. The voice connecting arrangements include six interface leads per circuit which are conventionally identified as CT/CR, CS/CG and CBS1/CBS2. The CTR and CR leads carry voice transmission, tone address signalling and call progress signalling as is known in the art. The CS/CG lines carry service request, answer/disconnect and DC dial pulsing information. Finally, the CBS1/CBS2 lines carry line status indication, seize/release and DC dial pulsing information. In the preferred embodiment, two of these leads, that is, the CG and CBS2 leads, are used as signal ground return for both of the voice connecting arrangements 15 and 27 and the remote switching unit 13. These leads are bonded to a common ground electrode. Accordingly, a four lead interface per circuit is employed in the present invention and the circuit routing matrix 51 is of the four pole type.

The output of each line control unit 41 is connected to the matrix switch assembly 51 which, as will be more fully explained hereinbelow, includes a matrix switching arrangement together with decoders and drivers therefor. The circuit routing matrix 51 has the function of providing an interconnect for the voice and signalling path between the line control units 41 and the 2-of-8 tone transceiver 55 and the trunk lines to the outlet exchanges. The circuit routing matrix is controlled by means of control signals from the microcomputer system 49.

The 2-of-8 tone transceivers 55 have the function of providing detection of touch-tone signals keyed into the system from a local subscriber telephone unit. These signals are converted to binary digital signals which are coupled to the central processing unit via the data line. In addition, the push button tone transceivers 55 transmit 2-of-8 tone signals via the circuit routing matrix 51 to outlet exchanges under the control of the microcomputer system 49.

Private and Switch Network Data Arrangement 61 provides transmission of signals on the data line linking the central processing system 11 with the microcomputer system 49. The arrangement for passing low speed data signals is of conventional design for the purpose of converting the digital signals from the microcomputer 49 to appropriate analog signals for transmission over the data link and for receiving analog signals over the data link and converting these signals to digital signals for processing by the microcomputer system 49. In the preferred embodiment, a dedicated line 56 is provided so that access between the central processing system 11 and the microcomputer 49 is on a continuous basis. Should the private line for some reason be out of order, a backup line, which preferably is a direct dial line, is also connected to the data transceiver. The use of a DDD network for data communications is a conventional technique employing Bell Data Access Arrangement CBS.

The operation of the line control unit 41, the switch matrix assembly 51 and the push button tone transceivers 55 is controlled by the microcomputer system 49 which includes a central processing unit and memory. Conventional control logic known in the art is employed in interfacing the microcomputer system 49 with the line control unit 41, the circuit routing matrix 51, the push button tone transceivers 55 and data transceivers 61. Finally, a progress tone signal generator 58 is provided for generating busy signals, error signals, etc. to advise the local subscriber of the status of the telephone call being placed. The progress tone signal generator accordingly is a conventional audio signal generator which is connected to the line control unit through a matrix to be explained more fully hereinbelow.

FIGS. 4-10 and the following description thereof is a more detailed description and schematic presentation of the Remote Satellite Unit. The unit is a hardware assembly of modules manufactured specifically for performing the aforementioned control of communications circuits. The hardware assembly is referred to in the preferred embodiment as an SST-1 Satellite Switch Terminal. As depicted in FIG. 3, it is composed of a Microcomputer System 49, a Line Control Group 41, a Circuit Routing Matrix 51, a Tone Transceiver Group 55, a Tone Generator Group 58 and a Private and Switch Network Data Line Arrangement 61. A detailed disclosure of each of these equipments is given hereinbelow. Although one embodiment will be described, it is to be understood that various changes and modifications may be made by those skilled in the art without departing from the spirit of the invention.

Figure 4:
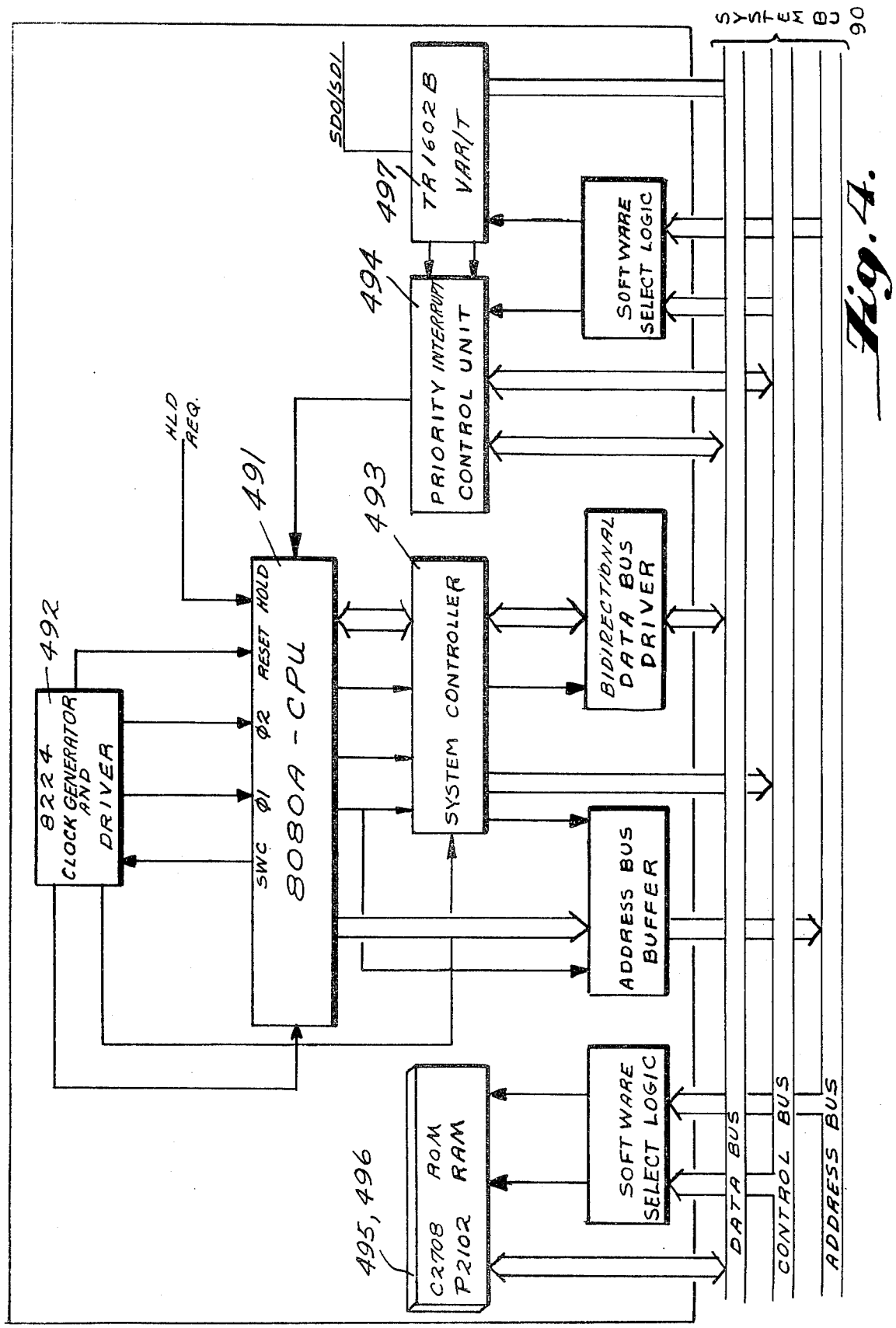

Refer now to FIG. 4, which is a detailed schematic illustration of the Microcomputer System 49. The Microcomputer System 49 used to in the preferred embodiment is a UP-607 Processor and SI-609 Scanner/Interrupt and consists of commercially available components and elements that interface with one another in an industry conventional configuration as shown in FIG. 4. The Microcomputer System controls and communicates with external components and equipment 41, 51, 55 and 61, in software selectable modes by industry conventional methods through a system bus 90.

The basic central processing unit is a group of Large Scale Integration (LSI) elements, which define the characteristics of the bus 90 and are a part of the Intel Corp. MCS-80 TM Microcomputer System. These elements are a C8080A CPU 491, a D8224 Clock Generator and a Driver 492, C8228 System Controller 493 and a P8214 Priority Interrupt Control Unit 494. In addition, the 8T95 and 8216 Interface Elements 492 and 494, respectively, provide requisite bus buffer/driver capability.

An industry standard configuration of memory elements is employed in the Microcomputer System and, as illustrated in FIG. 4, includes commercially available C2708 UV Erasable Programmable Read-Only Memory (PROM) 495 and P2102 Read Alternate Memory (RAM) 496. The stored program contained in the PROM which is used in the remote satellite unit is appendixed in the aforementioned copending application Ser. No. 793,428, by the present inventors. The stored program is presented in its entirety in the assembly language of the MCS-80 TM Microcomputer System. Software select logic used in addressing memory and other hardware elements throughout the remote satellite unit employ conventional Small Scale Integration (SSI) and Medium Scale Integration (MSI) logic elements. The specific decode function is accomplished using 74LS138 MSI logic element.

The Microcomputer System provides a conventional serial data interface for linking to the central computer system using a commercially available LSI element Universal Asynchronous Receiver/Transmitter (USAR/T) 497, such as Western Digital Corporation TR1602B or equivalent.

Figure 5:
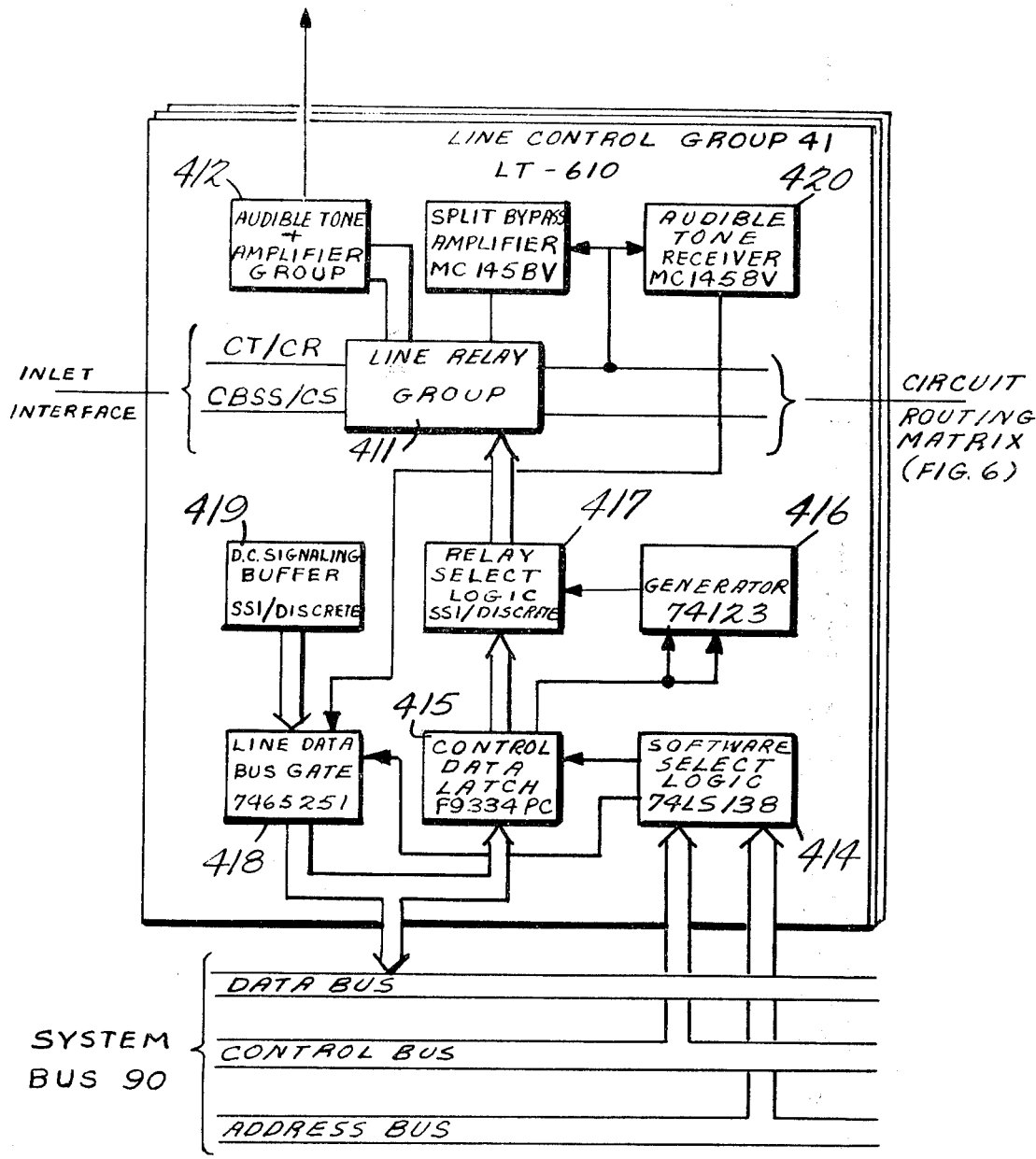

Refer now to FIG. 5, which is a more detailed schematic illustration of the Line Control Group 41. The Line Control Group 41 is an assembly of Line Control Units, as previously depicted in FIG. 3, each unit providing the requisite control between an inlet telephone circuit and an outlet telephone circuit via the Circuit Routing Matrix 51. As aforementioned, the control is performed by a Microcomputer System 49 via a System Bus 90 in software selectable modes.

The line Control Unit is referred to in the preferred embodiment of the present invention as an LT-610 Line Terminator. The unit consists of an assembly of elements for the detection and control of analog and DC signals on the trunk line. As aforementioned, the analog signals appear across telephone circuit interface leads CT/CR; and the DC signals appear between CBS1/CS and a signal common electrode.

As presented in FIG. 5, the interconnect between the inlet and outlet telephone circuit is on the Line Control Unit via a Line Relay Group 411, and then via the circuit Routing Matrix 51, as previously mentioned. The Line Relay Group 411 employs Complementary-MOS (CMOS) analog switches and dry reed relays for signal control. The CMOS elements used in the preferred embodiment are commercially available RCA CD4016 units. They are employed in the multiplexing of analog signals from the call progress tone sources via Audible Tone Amplifiers 412 and from other analog inputs from the Circuit Routing Matrix via Split Bypass Amplifier 413. The dry reed relays employed in the preferred embodiment are commercially available Struthers-Dunn MRRN Series Units. They are employed in the splitting of the analog signal line between the analog multiplex bus and the inlet signal pair CT/CR; in the splitting of the analog signal line between the Circuit Routing Matrix inlet and the inlet signal pair CT/CR; and in the individual breaking of the DC signal leads interconnected between the Circuit Routing Matrix inlet and the inlet DC signalling pair CBS1/CS.

Further, as presented in FIG. 5, are the Line Control Unit elements for the detection of analog and DC signals on the trunk line. These signals are detected by sampling, via the Micro-Computer System application program, the converted output of the Audible Tone Receiver 420 and the DC signalling Buffer 419. The Audible Tone Receiver is an AM Detector, as is well known in the art, and is designed for the detection of telephone network type audible tone signals with protection against interference from voice currents or other tone signalling systems; and the DC Signalling Buffer 419 provides high to low level voltage conversion between the trunk line interface CBS1/CS and the IC logic element interface.

The logic elements requisite to the software selectable Line Control Unit operation by the Micro-Computer System via the System Bus 90, consists of Standard MSI, SSI and discrete units interconnected in a conventional manner. As shown in FIG. 5, in the preferred embodiment, the decode function 414 employs 74LS138 MSI logic elements; the output data bus interface 415 uses F9334PC MSI logic elements and the input data base interface 418 uses 74LS251 MSI logic element. In addition, to support the duration of inputted audible tones, a cadence generator 416 makes use of a 74123 MSI logic element. Further, in the preferred embodiment, a conventional analog application of operational amplifiers employing Motorola MC1458V is used for the previously described amplifiers and receivers, 412, 413 and 420.

Figure 6:
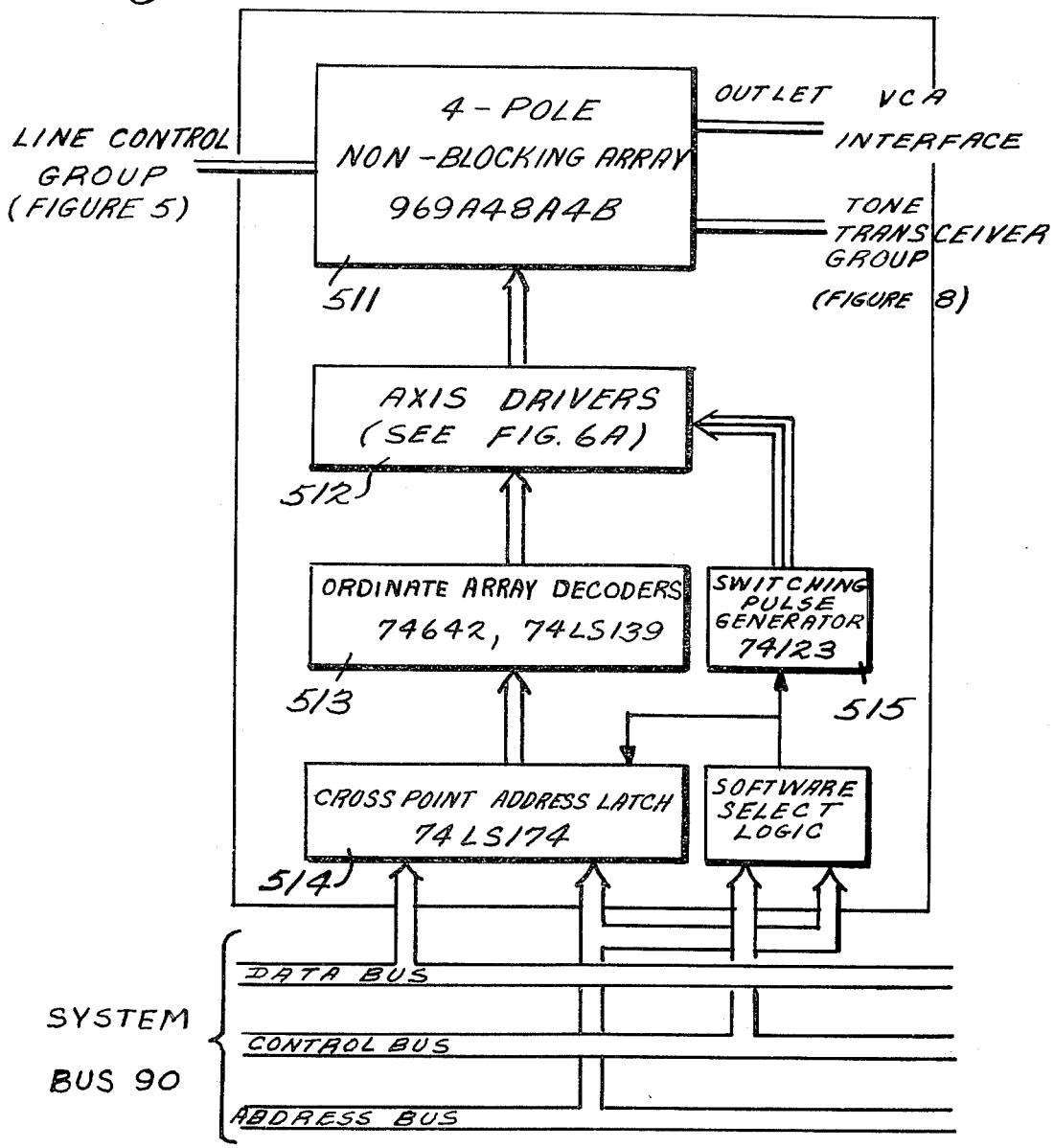

Refer now to FIG. 6, which is a detailed schematic illustration of the Circuit Routing Matrix 51. The Circuit Routing Matrix 51 provides switching between an inlet telephone circuit via a unit in the Line Control Group 41 and an outlet telephone circuit; between an inlet telephone circuit via a unit in the Line Control Group 41 and a unit in the Tone Transceiver Group 55; or between an inlet telephone circuit via a unit in the Line Control Group 41 and both the outlet telephone circuit and a unit in the Tone Transceiver Group 55. As aforementioned, the switching is performed by a Microcomputer System 49, via a System Bus 90, in software selectable modes.

The Circuit Routing Matrix 51 is referred to in the preferred embodiment of the present invention as an assembly of RY-612 Matrix and a BD-611 Buffer Decoder. The matrix unit consists of a sub-array, related axis drivers and ordinate decoders. The Buffer Decoder unit consists of array decoders, a switching timing circuit and the requisite logic interface with the System Bus 90 for the control by the Microcomputer System 49.

As presented in FIG. 6, the previously described interconnect is by way of a 4-Pole Non-Blocking Array 511. The defined array is obtained by cascading standard units of commercially available matrices. The matrix unit used in the preferred embodiment is a C.P.

Figure 6A:
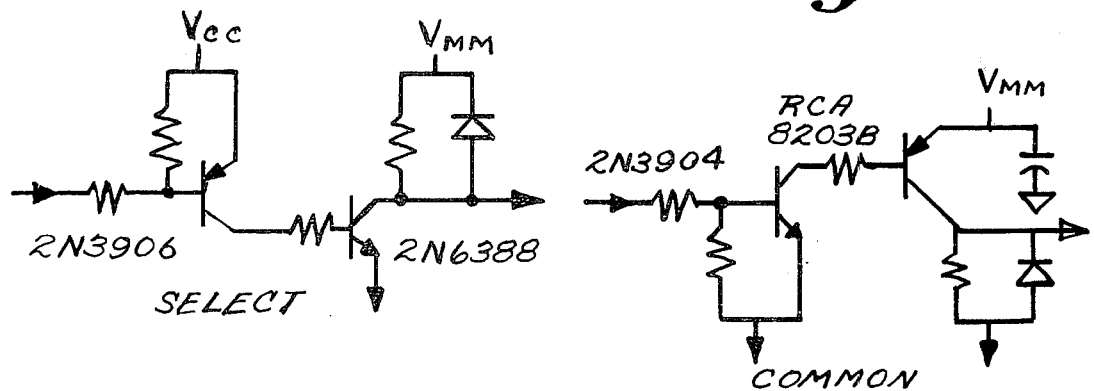

Clare Mini Memory Matrix 969A48A4B. A 4-pole crosspoint in the matrix is switched by Axis Drivers 512 which employ power transistor circuitry. FIG. 6A provides a discrete component schematic illustration of the circuitry used in the preferred embodiment to operate with the Clare Matrix, specifically identifying the commercially available drive and power transistor employed.

The logic elements requisite to the software selectable Circuit Routing Matrix operation by the Microcomputer System via the System Bus 90 consists of standard MSI and SSI units interconnected in a conventional manner. As shown in FIG. 6, for the preferred embodiment, the output data bus interface 514 uses 75LS174 MSI logic elements and the switching pulse duration timing circuit 515 makes use of a 74123 MSI logic element.

Refer now to FIG. 5, which is a detailed schematic illustration of the Tone Transceiver Group 55. The Tone Transceiver Group 55 is an assembly of transceiver units, as previously depicted in FIG. 3. A transceiver unit is used in the activation of the interconnect between an inlet telephone circuit and an outlet telephone circuit via the Circuit Routing Matrix 51. As aforementioned, the control is performed by a Microcomputer System 49 via a System Bus 90 in software selectable modes.

The Transceiver Unit is referred to in the preferred embodiment of the present invention as an RS-618 Register/Sender. The unit consists of an assembly of elements for the receiving and transmission of 2-of-8 tone signals on the telehone circuit and the control of a dial tone on the telephone circuit.

As aforementioned, the tone signals appear across telephone circuit interface leads CT/CR and are transmitted to and from the transceiver unit via the Line Control Unit and the Circuit Routing Matrix.

As presented in FIG. 7, the tone signals across the interface signal pair between the Transceiver Unit and the Circuit Routing Matrix are passed to a 2-of-8 Tone Receiver 556 via Input Amplifier 551 and Dial Tone Reject Filter 553. Further, tones are passed to the interface signal pair from the 2-of-8 Tone Encoder 557 via Low Pass Filter 554 and Output Amplifier 552 or are passed from the Dial Tone Bus via Switch 555, and output Amplifier 552. The Receiver 556 detects the presence of valid high and low band sinewaves used in tone dialing in the telephone network. The Filter 553 permits the detection of the 2-of-8 tones in the presence of a conventional dial tone as is known in the art. The Encoder 557 digitally synthesizes the high and low band sinewaves from an inputed 2-of-8 code. The filter 554 removes unwanted frequency components from the signal generated in the digital synthesization. The Input Amplifier 551, Output Amplifier 552 and Low Pass Filter 554 are of conventional analog design using operational amplifiers and in the preferred embodiment employs commercially available Motorola MC1458V amplifiers. The Dial Tone Bus Switch is a CMOS Analog Switch and in the preferred embodiment employs a commercially available RCA14016CD. The Dial Tone Filter 553 is a manufacturing application of hybrid technology as is known in the art and in the preferred embodiment employs commercially available KTI F853 filter. The 2-of-8 Tone Receiver 556, also a hybrid package, is a Mitel CM 8822. The 2-of-8 Tone Encoder is of CMOS construction and, in the preferred embodiment, is an application of a Motorola MC 1441OP device.

The logic elements employed in the interface with the System Bus 90 for the Transceiver Unit operation by the Microcomputer System consists of standard MSI and SSI units interconnected in a conventional manner. As shown in FIG. 7, for the software preferred embodiment, the select function 561 employs a 74LS138 MSI logic element; the output register function for the 2-of-8 code 560 employs P8212 MSI logic element; the output register function for the dial tone switch state 558 employs a 74LS74 MSI logic element, and the input 2-of-8 code data bus interface 559 employs 74368 MSI logic element.

Refer now to FIG. 8, which is a more detailed schematic illustration of the Progress Tone Generator Group 58. The Progress Tone Generator Group is an assembly of tone sources used in generating audible tone signals by the Tone Transceiver Group 55, as previously described and by the Line Control Group 41, as previously described. The signals are employed to give information to system users about the progress or disposition of the telephone call.

The Progress Tone Generator Group 58, in the preferred embodiment of the present invention, is a single unit referred to as a MO-619 Master Oscillator. As identified in FIG. 8, the unit employs, for the basic tone source, circuits which are typical semiconductor applications of commercially available components.

Each of the tones are generated from circuit variations in the application of a Motorola MC14410 Tone Encoder. The output of each of the Tone Encoders is one or a pair of digitally synthesized sinewaves and is coupled to the related tone bus via an active filter and output amplifier. The active filter is employed to attenuate unwanted frequency components created in the digital synthesization of the sinewaves. The filters and amplifiers are conventional applications of the Motorola MC1458V operational amplifier.

The MC14410 tone encoder accepts digital coded inputs for the tones. The digital coded inputs control an external clocked frequency generator. The dial tone from generators 581 and the beep tone from generator 582 are single frequencies and are generated from a fixed code which is continuously applied to the encoder and a crystal clock input.

The error tone from generator 583 is a varying single frequency and is generated from a fixed code for the center frequency which is continuously applied to the encoder and a varying clock input. The varying clock input is from a Voltage Controlled Oscillator (VCO) circuit which, in the preferred embodiment, is a conventional application of the Motorola MC14046CP Phase-Locked Loop CMOS Integrated Circuit. The control voltage input to the VCO, in effect the frequency modulation of the sweep input, is from a single frequency oscillator output at the sweep frequency. The sweep oscillator circuit is a conventional operational amplifier circuit design employing in the preferred embodiment Motorola MC1458V units.

The no circuit tone from generator 584 is an interrupted single frequency pair and is generated from a fixed code, which is continuously gated to the input of the encoder at the interruption rate and from a crystal clock input. The gate control, in effect the amplitude modulation of the cadence input, is supplied from a conventional timer circuit design, which in the preferred embodiment employs as the basic element the Signetics Ne556 unit.

Figure 9:
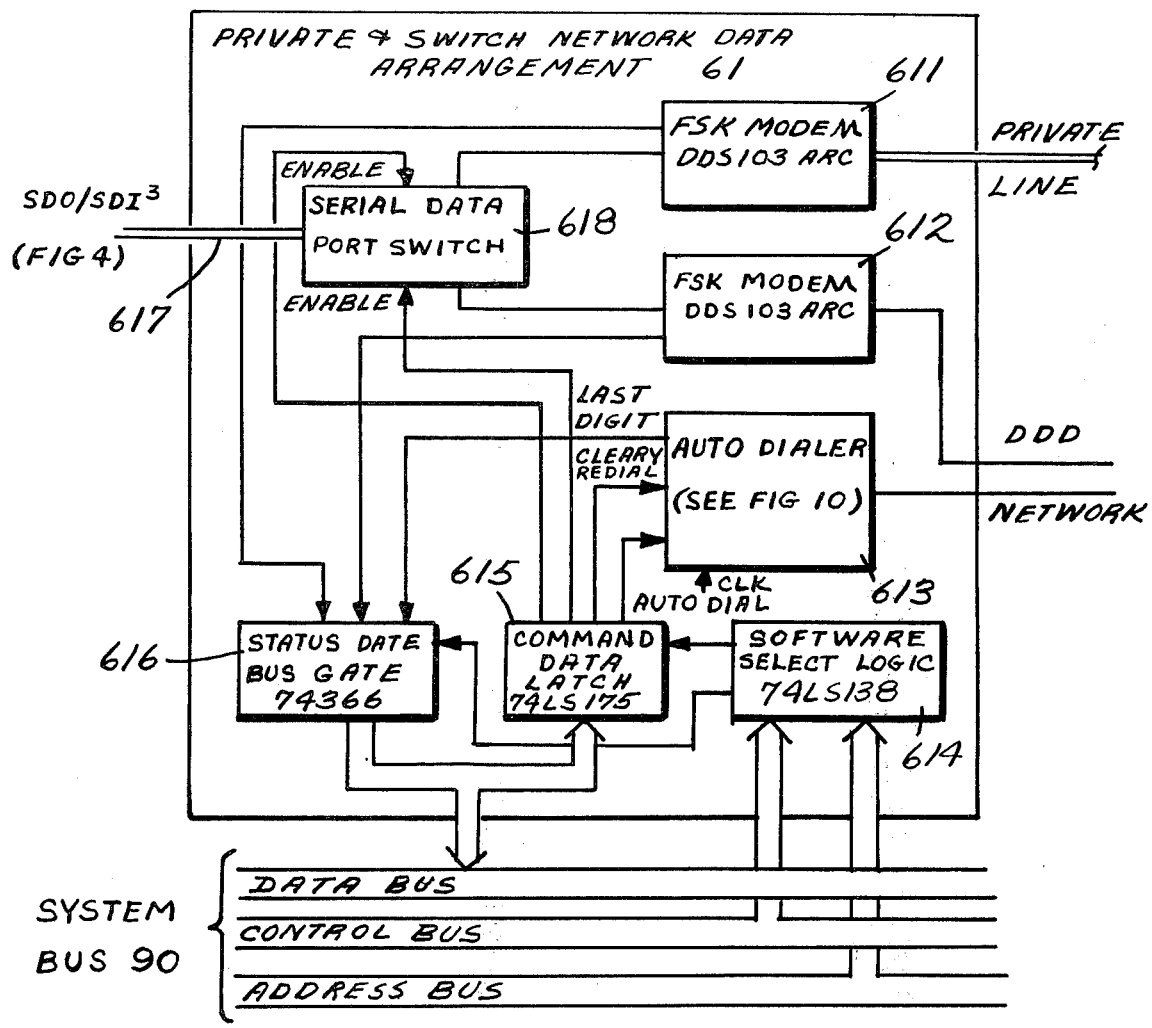

Refer now to FIG. 9, which is a more detailed schematic illustration of the Private and Switched Network Data Arrangement 61. As previously depicted in FIG. 3 and in FIG. 9, the data arrangement is that element of the Remote Satellite Unit which provides the interface with a private line facility and alternately the switched network for the data communication between the Microcomputer System and the Central Computer System. As aforementioned, the selection of which communications path is to be employed is performed by the Microcomputer System 49 via System Bus in software selectable modes.

As illustrated in FIG. 9, the Private and Switched Network Data Arrangement 61 is a data access interface which includes two Modems 611,612, one for the primary path (Private Wire) and one for the alternative path (DDD Network), on Automatic Dialer 613; and an interface with the System Bux 90 for software control. In the preferred embodiment, the modem is referred to as MM-620 Modem Module and the autodialer and system bus interface as DB-621 Dial Back Up Unit.

The FSK Modems 611, and 612 provide 2 wire full duplex operation in support of 300BPS Frequency Shift Keying (FSK) data transmission and is commonly referred to in the art by Bell hardware model numbers 103/113. The unit used in the preferred embodiment is Universal Data System, Model USD103ARC. As identified, the carrier detect signal output from both modems are inputs to the Microcomputer interface logic and are used in the software selection of the communication path. Further, as shown, the communications path selected is interconnected with Microcomputer System serial data interface 617 by a software output command, which enables the appropriate path in the data port switch 618.

The Autodialer 613, upon software command, provides a fully automatic dial up operation into the DDD network. Signals from the Microcomputer System via the System Bus interface logic are, as identified, an Enable (Auto Dial Enabler), Done (Last Digit), and a Reset/Retry (Clear/Redial). The Autodialer performs all other functions requisite to automatic calling through the network via a Bell provided Data Access Arrangement (DAA) which, by standard Bell reference designation, is data coupler CBS.

The logic elements requisite to the software selectable Private and Switch Data Arrangement by the Microcomputer System via the System Bus 90 consists of standard MSI and SSI units interconnected in a conventional manner. As shown in FIG. 9, for the preferred embodiment, the select function 614 employs a 74LS 138MSI logic element; output register function for the command data 615 employs a 74LS175 MSI logic element; and input data bus interface 616 employs a 74366 MSI logic element.

Figure 10:
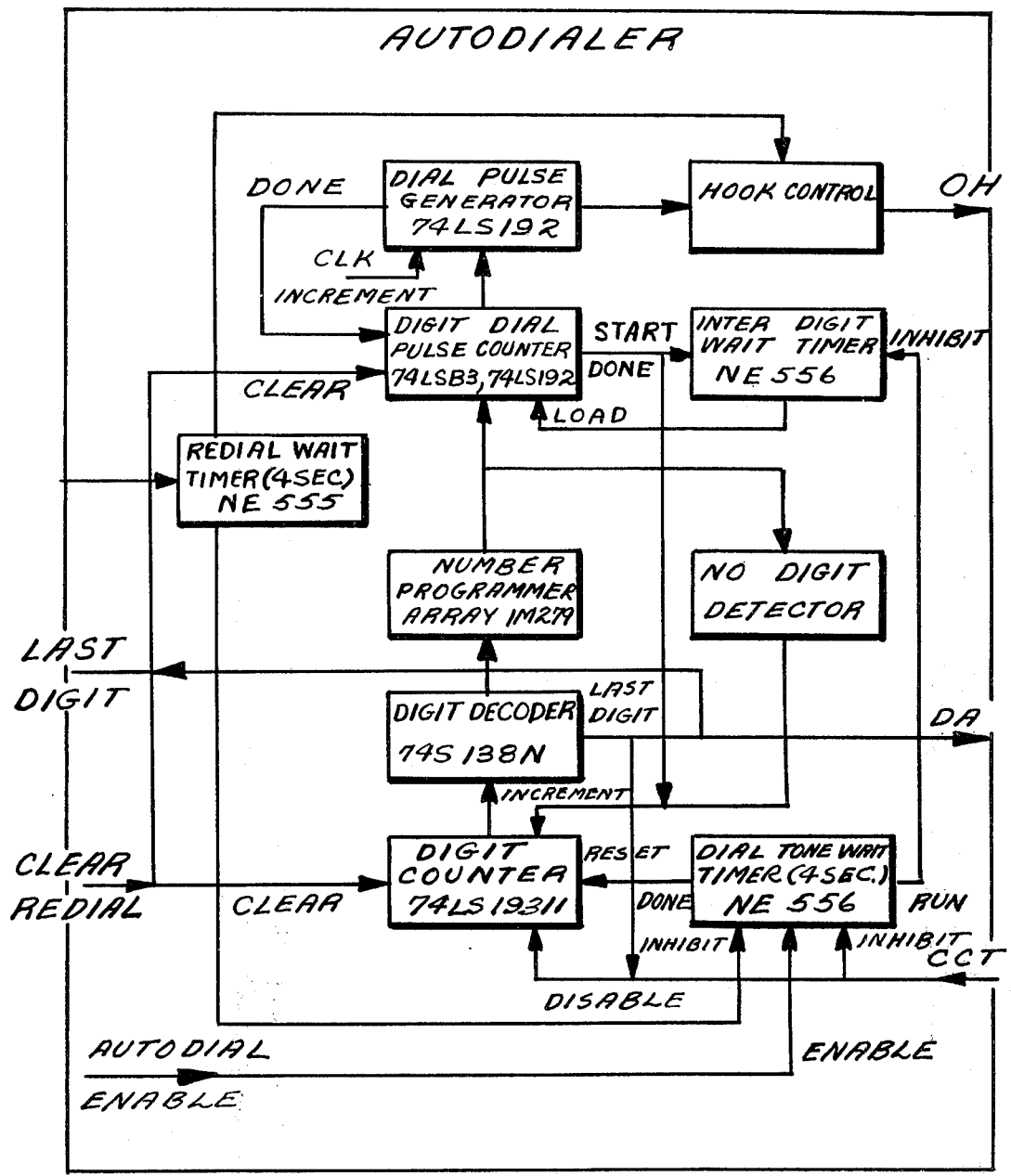

Refer now to FIG. 10, which details the Autodialer 613 circuitry. Identified is the CBS data coupler control lead interface as required for call originations consisting of OH, DA and CCT, as known by Bell reference. The Autodialer is a sequence controller operating in accordance with Dial Pulse Origination sequence criteria, as established for operations in the DDD network.

The sequence controller employs conventional SSI and MSI logic elements in standard applications. As shown, the time delay requirements of Redial Wait, Dial Tone Wait and Interdigit Wait make use of a commercially available general purpose timer as referenced. The more critical timing needs for dial pulse accuracy are obtained from a clock input which is CPU crystal sourced. The final dial pulse make/break rates derive from up counts of 10 ms. The count sequence for the make/break ratio, dial pulse count, and digit count employ MSI counter logic elements as referenced. Dial number programmability is by BCD switch control of a diode array employing a general purpose diode as referenced, with digit selection achieved with MSI decoder logic element as referenced. The referenced full adder MSI logic element, as part of the digit counter, is used to decrement the loaded number by one, for subsequent correct count. The remaining controller logic is standard application of SSI elements.

While the present invention has been described in connection with a single remote switching circuit, it should be understood that the central computer 11 can be utilized with a single integral switching circuit, or can be utilized to control in tandem a plurality of remote switching units. Thus, for example, assume that a caller wishes to place a call to a long-distance city, but the cheapest bulk rate lines available are through one or more other remote switching units. In this case, the central processing unit, after determining the area code of the party being called, interrogates a number of other remote switching units to determine whether bulk rate lines are available for transmitting the call to the remote party. If such lines are available, the central processing unit provides command signals to the respective remote switching units to route the call therethrough to the remote telephone unit being called.

While the present invention has been disclosed with respect to a preferred embodiment thereof, it should be understood that there may be other embodiments which fall within the sphere and scope of the invention as defined by the appended claims.

What is claimed:

1. In a telephone communications lines control system for controllably connecting local subscriber telephone units to long distance lines including a plurality of remote switching means for connecting local subscriber telephone units to selected long distance telephone lines, a central control means positioned at a location remote from said switching means for controlling the connection of said local subscriber telephone units to said selected long distance telephone lines, and means for connecting said central control means to said plurality of remote switching means, said interconnecting means transmitting data signals between said remote switching means and said central control means, a call back system comprising means for monitoring the status of said telephone lines, and for generating a "line not available" signal when one of said subscriber units attempts to access a predetermined set of lines and none of said lines are available, and for generating a "line available" signal when one of said set of lines becomes available;

means responsive to said "line not available" signal for storing the telephone number of at least one subscriber unit attempting to access said "not available" lines in predetermined locations in a memory;

means responsive to said "line available" signal for scanning said memory locations in a predetermined sequence and calling the subscriber unit number in the memory location first in said sequence, and means responsive to said "line available" signal for generating a control signal to said switching means to cause such switching means to connect said called subscriber unit to said available line when said called subscriber unit goes off hook.

2. A telephone communications control system for controlling the connection of a local subscriber telephone unit to long distance lines comprising:
switching means for connecting said local subscriber telephone unit to selected long-distance telephone lines, said switching means including a switching matrix and means for operating said switching matrix;
a central control means for controlling said operating means, said central control means including means for selecting said long distance lines in accordance with a predetermined priority selection basis;
means for determining when a priority telephone line is not available;
means responsive to said determining means for storing the long distance telephone number of a telephone unit to be accessed;
means responsive to said determining means for storing said local subscriber unit's telephone number,
means for continually determining the status of a group of long distance priority telephone lines and generating a signal when a priority line is available;
means responsive to said priority line available signal for calling back said subscriber unit;
means for generating central control means access signals when said subscriber telephone unit goes off-hook, said central control means instructing said operating switch means to operate said switch matrix to selectively connect said available priority line to said local subscriber unit.

3. The system of claim 2 further comprising means responsive to said access signals for automatically placing on said priority line a call to said number to be accessed.

4. The system of claim 3 wherein said priority selection basis is least-cost lines first.

5. The system of claim 2 wherein said priority selection basis is least-cost lines first.

6. A telephone communication lines control system for controllably connecting local subscriber telephone units to long-distance lines comprising:
switching means responsive to control signals applied thereto for selectively connecting subscriber telephone units to selected long distance telephone lines;
means for monitoring the status of said telephone lines, and generating a "line not available" signal when one of of said subscriber units attempts to access a predetermined set of lines and none of said lines are available, and a "line available" signal when one of said set of lines becomes available;
means responsive to said "line not available" signal for storing the telephone number of at least one subscriber unit attempting to access said "not available" lines in predetermined locations in a memory;
means responsive to said "line available" signal for scanning said memory locations in a predetermined sequence and calling the subscriber unit number in the memory location first in said sequence; and
means responsive to said "line available" signal for generating a control signal to said switching means to cause said switching means to connect said called subscriber unit to said available line when said called subscriber unit goes off-hook.

7. The system of claim 6 further comprising means for storing the long distance telephone numbers of telephones to be accessed by said subscriber units, and means for automatically placing said call when said called subscriber unit goes off-hook.

8. The system of claim 7 wherein the number of said subscriber units attempting to access said "non available" lines are stored in successive locations in memory, and said means for scanning comprises means for effecting the calling of said stored subscriber numbers on a first-in, first-out basis.

9. The system of claim 7 wherein the telephone numbers of said subscriber units attempting to access "non available" lines are stored in predetermined queues of sequential memory locations, a given subscriber number being stored in one of said queues in accordance with predetermined priority status criteria;
and said means for scanning comprising means for effecting calling of said stored subscriber unit numbers on a priority basis, first calling all numbers stored in a predetermined one of said queues.

10. The system of claim 6 wherein the number of said subscriber units attempting to access said "non available" lines are stored in successive locations in memory, and said means for scanning comprises means for effecting the calling of said stored subscriber unit numbers on a first-in, first-out basis.

11. The system of claim 6 wherein the telephone numbers of said subscriber units attempting to access "non available" lines are stored in predetermined queues of sequential memory locations, a given subscriber unit being stored in one of said queues in accordance with predetermined priority status criteria;
and said means for scanning comprising means for effecting calling of said stored subscriber unit numbers on a priority basis, first calling all numbers stored in a predetermined one of said queues.

12. In a telephone communications lines control system including switching means responsive to control signals applied thereto for selectively connecting subscriber units to selected long distance telephone lines, and control means for generating said control signals to said switching means, a method of controllably connecting subscriber telephone units to long-distance telephone lines in accordance with a predetermined line selection basis comprising the steps of:
detecting the off hook condition of a subscriber telephone unit;
accessing said control means in response to the detection of an off-hook condition of said subscriber telephone unit;
receiving the number called by said subscriber telephone unit;
informing said control means of the long-distance telephone number being called;
placing said call automatically on an available one of said long-distance telephone lines, said one line being selected by said central control means in accordance with said line selection basis;
determining when no lines are available in accordance with said line selection basis, and storing the long-distance telephone number of the telephone unit to be accessed and the number of the calling subscriber unit;
continually determining the status of said telephone lines in accordance with said line selection basis;
determining when a telephone line in accordance with said line selection basis is available;
calling back said calling subscriber unit;

detecting when said subscriber unit goes off-hook; and automatically connecting said calling subscriber unit to said available line when said subscriber unit goes off-hook.

13. The method of claim 12 wherein said predetermined line selection basis is the order of the least-cost line available first.

14. The method of claim 12 further comprising the step of automatically placing said call when said subscriber unit goes off-hook.

* * * * *